United States Patent Office 3,700,458

Patented Oct. 24, 1972

3,700,458

CHEMICAL PROCESS

Robert D. Lindholm, Rochester, N.Y., assignor to Eastman Kodak Company, Rochester, N.Y.

No Drawing. Filed Mar. 1, 1971, Ser. No. 119,955
Int. Cl. G03c *1/02, 1/72*
U.S. Cl. 96—114.1 7 Claims

ABSTRACT OF THE DISCLOSURE

Noble metal salts of carboxylic acids suitable for use in photosensitive and thermosensitive compositions and elements are prepared by admixing a non-aqueous solution of a noble metal trifluoroacetate or tetrafluoroborate with a non-aqueous solution of a carboxylic acid in the presence of an organic peptizer. Photosensitive and thermosensitive compositions can be made by admixing a non-aqueous dispersion of a noble metal salt of an organic acid, such as silver behenate, with a suitable organic reducing agent and a catalyst. The compositions can contain addenda suitable in photosensitive and thermosensitive compositions and elements.

BACKGROUND OF THE INVENTION

Field of the invention

This invention relates to a method of preparing noble metal salts of carboxylic acids, as well as photosensitive compositions and elements containing such salts suitable for processing with heat. In one of its aspects it relates to a method of preparing a noble metal salt of a carboxylic acid, e.g., silver behenate, by reacting an organic carboxylic acid, such as behenic acid, with a noble metal trifluoroacetate or tetrafluoroborate, in an organic solvent in the presence of an organic peptizer, such as polyvinyl butyral. In another of its aspects, it relates to a method of preparing a photosensitive composition suitable for processing with heat containing a reducing agent and a noble metal salt of a carboxylic acid. A further aspect relates to a method of preparing a photosensitive and thermosensitive element by admixing a non-aqueous dispersion of a noble metal salt of a carboxylic acid with a non-aqueous dispersion of a reducing agent and a photosensitive component and coating the resulting composition on a support.

Description of the state of the art

It is known that a mixture of silver behenate and behenic acid suitable for use in a photosensitive and thermosensitive element can be prepared by reacting an aqueous solution of silver nitrate with an aqueous solution of sodium behenate. Methods of preparing silver behenate are set out, for example, in U.S. Pats. 2,910,377 of Owen issued Oct. 27, 1959; U.S. 3,074,809 of Owen issued Jan. 22, 1963; U.S. 3,080,254 of Grant issued Mar. 5, 1963; U.S. Pat. 3,094,619 of Grant issued June 18, 1963; U.S. Pat. 3,107,174 of Wartman issued Oct. 15, 1963 and U.S. Pat. 3,218,166 of Reitter issued Nov. 16, 1965. It is known also that a mixture of silver behenate and behenic acid, suitable for photosensitive and thermosensitive elements, can be prepared by (a) reacting behenic acid with sodium hydroxide in an aqueous ethanol solution, and (b) combining the resulting mixture of sodium behenate and behenic acid (half-soap) with an aqueous solution of silver nitrate under non-alkaline conditions. This is described by Sorensen and Shepard in U.S. Pat. 3,152,904, issued Oct. 13, 1964 and by Morgan and Shely in U.S. Pat. 3,457,075, issued June 22, 1969. In addition, it is known that silver behenate having an average particle size between 5 and 50 microns can be prepared by reacting an aqueous ammonia solution of silver nitrate with a benzene and water dispersion containing an equimolar amount of behenic acid as described by Bryan in U.S. Pat 3,458,544 issued July 29, 1969.

The described processes involve multi-step operations which eventually require the isolation, washing and purification of the final materials such as silver behenate or behenic acid and silver behenate (half-soap) before admixing with other components to form a photosensitive and thermosensitive composition or element.

There has been a need for a simplified method of preparing noble metal salts of carboxylic acids suitable for use in photosensitive compositions, elements and processing with heat. There has also been a need for a method which avoids the necessity of recovering the product before admixing it with other components to form a photosensitive and thermosensitive composition or element.

SUMMARY OF THE INVENTION

According to the invention, such a simplified method is provided by preparing a noble metal salt of a carboxylic acid comprising admixing a non-aqueous solution of an organic carboxylic acid with a non-aqueous solution of a noble metal trifluoroacetate or tetrafluoroborate in the presence of an organic peptizer.

According to this method a photosensitive and thermosensitive composition is prepared by admixing a non-aqueous solution of a noble metal salt of a carboxylic acid with a non-aqueous solution of a noble metal trifluoroacetate or tetrafluoroborate in the presence of an organic peptizer with a reducing agent and a photosensitive component, and a photosensitive and thermosensitive element is prepared by coating the resulting composition on a support.

DETAILED DESCRIPTION OF THE INVENTION

A number of noble metal salts of carboxylic acids can be prepared by the described method. An especially suitable class of noble metal salts of carboxylic acids is represented by the water insoluble silver salts of long-chain fatty acids, e.g., those which are stable to light. Compounds which are suitable silver salts of long-chain fatty acids include, for example, silver behenate, silver stearate, silver oleate, silver laurate, silver hydroxystearate, silver caprate, silver myristate and silver palmitate. Other suitable silver salts of organic acids are silver benzoate, silver saccharin, silver o-aminobenzoate, silver acetamidobenzoate, silver furoate, silver p-phenylbenzoate, silver phenylacetate and silver salicylate. Noble metal salts of carboxylic acids which are not silver salts can be prepared by the described method if desired. These include, for instance, auric behenate, auric stearate, mercuric behenate and the like, but silver salts of long-chain fatty acids such as silver behenate are preferred.

The noble metal salt of the carboxylic acid is prepared by a method comprising admixing a non-aqueous solution of an organic carboxylic acid with a non-aqueous solution of a noble metal trifluoroacetate or tetrafluoroborate in the presence of an organic peptizer.

The noble metal salts are advantageously dissolved in non-aqueous solvent, such as acetone, methanol, ethanol, propanol and/or isobutyl alcohol. Combinations of non-aqueous solvents can be employed, if desired. The carboxylic acids are also advantageously dissolved in non-aqueous solvents, e.g., hydrocarbon solvents such as toluene and/or xylene.

A range of organic peptizers, especially organic polymeric peptizers can be employed in the process of the invention. Suitable organic peptizers include polyvinyl acetals. An especially suitable polyvinyl acetal is polyvinyl butyral which is derived from polyvinyl alcohol and butyraldehyde. Other polyvinyl acetals which can be used in the practice of the invention include those derived from the reaction between polyvinyl alcohol and aldehydes having 2 to 12 carbon atoms such as acetaldehyde, heptaldehyde and lauraldehyde. Copolymers, such as copoly-[3-thiapentylacrylate, ethyl acrylate] and copoly[3-thiapentylacrylate, n-butyl acrylate] can be employed, if desired. The above organic peptizers can be used alone or combinations of organic peptizers can be employed.

The method of preparation, as described, is advantageously carried out by the controlled addition of a non-aqueous solution of a noble trifluoroacetate or tetrafluoroborate, to a non-aqueous solution of a carboxylic acid, e.g., behenic acid, in the presence of a polymeric peptizer, e.g., polyvinyl butyral. However, the non-aqueous solution of the carboxylic acid can be added to the non-aqueous solution of the noble metal salt. The described polymeric peptizer is advantageously present in one or both of these solutions. However, if desired the peptizer can be present in a separate non-aqueous solution, e.g., in acetone, methanol, ethanol, propanol, and/or isobutyl alcohol and/or a hydrocarbon solvent such as xylene and/or toluene. When the peptizer is present in a separate non-aqueous solution then the non-aqueous solution of the noble metal trifluoroacetate or tetrafluoroborate and the non-aqueous solution of the carboxylic acid can be added to the non-aqueous solution containing the peptizer. In either case, the process, as described, provides the advantage that (1) the particle size of the product can be predetermined, such as by varying the concentration of the reagents, employing a temperature range suitable to a desired grain size and increasing or decreasing the rate of mixing. The average particle size, as determined by an optical microscope, can be varied, for instance, from about 0.1 micron to about 1.0 micron in the process of the invention as described. The process also provides the advantages (2) that the resulting noble metal salt of the carboxylic acid, as described, can be added directly to a photosensitive and thermosensitive composition, thereby eliminating the need to isolate the product, and (3) extensive mixing procedures such as ball-milling of the reactant mixture is eliminated.

The method of preparation can be carried out over a wide temperature range; however, it is typically carried out at between about 18° C. and about 40° C.

The reactants in the described process are typically mixed in about stoichiometric concentrations, but in some instances, it is desirable to use an excess of one reactant to force the reaction to completion. The most suitable concentration of the individual noble metal salt and/or of the carboxlic acid solutions is dependent upon several factors such as the solubility of the components in the solvent, the particular noble metal salt, particular carboxylic acid, the peptizer employed and the like. A typical concentration of noble metal trifluoroacetate or tetrafluoroborate for a reactant solution is typically 0.001 molar to 1.0 molar.

A suitable concentration of peptizer, as described, will also vary depending upon several factors, such as the particular reactants and solvents, the particular peptizer and the concentration of the described solutions. A suitable concentration of peptizer is usually about 5 grams to about 200 grams per liter of solution. It is often desirable to use as low a concentration of solvent as possible to avoid the need to remove the solvent, e.g., by evaporation, in a subsequent step, e.g., when the product is mixed with a photosensitive and thermosensitive composition and coated on a suitable support.

One embodiment of the invention is a method of preparing noble metal salt of a carboxylic acid comprising admixing a non-aqueous solution of an organic carboxylic acid with a non-aqueous solution of a noble metal trifluoroacetate or tetrafluoroborate in the presence of an organic peptizer. For example, the method of preparing a noble metal salt of a carboxylic acid, e.g., silver behenate, can comprise admixing an acetone solution of silver trifluoroacetate with a toluene solution of behenic acid in the presence of polyvinyl butyral. Also, for example, the method of preparing a noble metal salt of a carboxylic acid, e.g., silver behenate, can comprise admixing a toluene solution of behenic acid in the presence of polyvinyl butyral with an acetone solution of silver tetrafluoroborate.

If desired, the noble metal salt of the carboxylic acid, e.g., silver behenate, can be isolated from the reactant mixture. But, this is not necessary when the noble metal salt of the carboxylic acid is to be employed in a composition, e.g., a photosensitive and thermosensitive composition, which contains components which are compatible with the solvent and peptizer employed in the described process. For example, it is not necessary to isolate silver behenate prepared, as described, in the presence of polyvinyl butyral, when the resulting product is to be employed in a photosensitive and thermosensitive composition which contains a binder which is compatible with other components of the composition, e.g., a polyvinyl butyral binder.

Another embodiment of the invention, accordingly, is: a method of preparing a photosensitive and thermosensitive composition comprising (a) admixing a non-aqueous solution of an organic carboxylic acid with a non-aqueous solution of a noble metal trifluoroacetate or tetrafluoroborate in the presence of an organic peptizer, each as described, and (b) admixing the resulting product with a reducing agent and a photosensitive component.

For example, the method of preparing a photosensitive and thermosensitive composition can comprise:

(a) admixing an acetone solution of silver trifluoroacetate, e.g., 0.40 molar, with a toluene solution of behenic acid, e.g., 0.10 molar, at a rate of about 2.0 ml./minute in the presence of polyvinyl butyral, and (b) admixing the resulting product, which is a silver behenate dispersion, with a (i) a photosensitive component, e.g., photosensitive silver halide,
(ii) a reducing agent, e.g., 2,2′-dihydroxy-1,1′-binaphthyl,
(iii) an activator-toning agent, e.g., phthalimide, and
(iv) a sensitizing dye, e.g., 3-carboxymethyl-5-[(3-methyl-2-(3)-thiazolinylidene)isopropylidene]rhodanine.

Still another embodiment of the invention is a method of preparing a photosensitive element comprising (a) Admixing a non-aqueous solution of an organic carboxylic acid with a non-aqueous solution of a noble metal salt in the presence of an organic peptizer, (b) Admixing the resulting product with a reducing agent and a photosensitive component and (c) Coating the resulting composition on a support.

For example, the method of preparing a photosensitive and thermosensitive element can comprise (a) Admixing a toluene solution of behenic acid with an acetone solution of silver trifluoroacetate or silver perchlorate in the presence of an organic polymeric peptizer such as polyvinyl butyral, (b) Admixing the resulting silver behenate dispersion with (i) 2,2′-dihydroxy-1,1′-binaphthyl,
(ii) silver bromide, and (c) Coating the resulting composition on a support.

The described photosensitive and thermosensitive composition and element contain a photosensitive salt, especially a photosensitive silver salt. A typical concentration range of photosensitive salt is from about 0.005 to about 0.50 mole of photosensitive salt per mole of noble metal salt of organic acid, e.g., per mole of silver behenate. Preferred photosensitive salts are photosensitive silver halides, e.g., silver chloride, silver bromide, silver bromoiodide, silver chlorobromoiodide, or mixtures thereof. The photosensitive silver halide can be coarse or fine-grain, very fine-grain emulsions being especially useful. The emulsion containing the photosensitive silver halide can be prepared by any of the well-known procedures in the photographic art, such as single-jet emulsions, double-jet emulsions, such as Lippmann emulsions, ammoniacal emulsions, thiocyanate or thioether ripened emulsions, such as those described in U.S. Patent 2,222,264 of Nietz et al. issued Nov. 14, 1940; U.S. Patent 3,320,069 of Illingsworth issued May 15, 1967, and U.S. Patent 3,271,-157 of McBride issued Sept. 6, 1966. Surface image silver halide emulsions can be used if desired, mixtures of surface and internal image silver halide emulsions can be used as described in U.S. Patent 2,996,332 of Luckey et al. issued Apr. 15, 1961. Negative type emulsions can be used. The silver halide emulsion can be a regular grain emulsion such as described in Klein and Moisar, Journal of Photographic Science, volume 12, No. 5, September–October (1964) pages 242–251.

The silver halide emulsions employed in the practice of the invention can be unwashed or washed to remove soluble salts. In the latter case the soluble salts can be removed by chill setting and leaching or the emulsion can be coagulation washed.

The silver halide employed in the practice of the invention can be sensitized with chemical sensitizers, such as with reducing agents; sulfur, selenium, or tellurium compounds; gold, platinum, or palladium compounds; or combinations of these. Suitable procedures are described for example, in U.S. Patent 1,623,499 of Shepard issued Apr. 5, 1927; U.S. Patent 2,399,083 of Waller et al. issued Apr. 23, 1946; U.S. Pat. 3,297,447 of McVeigh issued Jan. 10, 1967; and U.S. Patent 3,297,446 of Dunn issued Jan. 10, 1967.

Photosensitive silver halide employed in the practice of the invention can be protected against the production of fog and can be stabilized against loss of sensitivity during keeping. Suitable antifoggants and stabilizers, e.g., used alone or in combination include, for example, thiazolium salts; azaindenes; mercury salts as described, for example, in U.S. Patent 2,728,663 of Allen et al. issued Dec. 27, 1955; urazoles; sulfocatechols; oximes described, for example, in British Patent 623,448; nitron; nitroindazoles; polyvalent metal salts described, for example, in U.S. Patent 2,839,405 of Jones issued June 17, 1958; platinum, palladium and gold salts described, for example, in U.S. Patent 2,566,263 of Trivelli et al. issued Aug. 28, 1951, and U.S. Patent 2,597,915 of Yutzy et al. issued May 27, 1952.

Suitable organic reducing agents which can be employed in the described combination include, for example, substituted phenols and naphthols. A bis-naphthol which is preferred is a bis-β-naphthol of the formula:

(I)

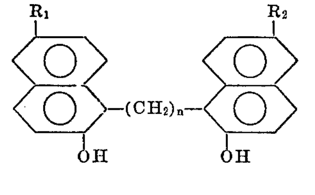

wherein $R_1$ and/or $R_2$ is hydrogen, alkyl with 1 to 3 carbon atoms, e.g., methyl, ethyl or propyl, alkoxy, e.g., alkoxy containing 1 to 2 carbon atoms, such as methoxy or ethoxy; halogen, nitro, amino or a diazonium halide salt and *n* is 0 or 1. Suitable bis-β-naphthols which can be employed in the practice of the invention include:

2,2′-dihydroxy-1,1′-binaphthyl,
6,6′-dibromo-2,2′-dihydroxy-1,1′-binaphthyl,
6,6′-dinitro-2,2′-dihydroxy-1,1′-binaphthyl and/or
Bis-(2-hydroxy-1-naphthyl)methane The described reducing agents are suitable in a range of concentration; however, they are especially suitable, at a concentration from about 0.10 to about 0.75 mole of reducing agent per mole of oxidizing agent, e.g., per mole of silver behenate.

Other reducing agents, which are typically silver halide developing agents, can be used in conjunction with or in place of the above bis-naphthol reducing agents. Suitable silver halide developing agents include, for example, polyhydroxybenzenes such as hydroquinone developing agents, e.g., hydroquinone, alkyl-substituted hydroquinones as exemplified by tertiary butylhydroquinone, methylhydroquinone, 2,5-dimethylhydroquinone and 2,6-dimethylhydroquinone; catechols and pyrogallol; halo-substituted hydroquinones such as chlorohydroquinone or dichlorohydroquinone; alkoxy-substituted hydroquinones such as methoxyhydroquinone or ethoxyhydroquinone; methylhydroxynaphthalene; phenylendiamine developing agents; methylgallate; aminophenol developing agents, such as 2,4-diaminophenols and methylaminophenols; ascorbic acid developing agents such as ascorbic acid, ascorbic acid ketols and ascorbic acid derivatives such as those described in U.S. Pat. 3,337,342 of Green issued Aug. 22, 1967; hydroxylamine developing agents such as N,N′-di-(2-ethoxyethyl)hydroxylamine; 3-pyrazolidone developing agents such as 1-phenyl-3-pyrazolidone and 4-methyl-4-hydroxymethyl-1-phenyl-3-pyrazolidone including those described in British Pat. 930,572 published July 3, 1963; hydroxytetronic acid, and hydroxytetronmide developing agents, reductone developing agents such as anhydrodihydropyrrolidino hexose reductone; and the like.

It is desirable to employ as activator-toning agent in the elements, compositions and processes of the invention to obtain a desired image, particularly when phenolic reducing agents are used. A suitable activator-toning agent is a heterocyclic activator-toning agent containing at least one nitrogen atom and of the formula:

(II)

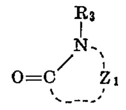

where $R_3$ is hydrogen, hydroxyl, or a metal ion such as potassium, sodium, lithium, silver, gold or mercury; $Z_1$ represents atoms completing a heterocyclic nucleus, especially a 5 or 6 member heterocyclic nucleus. The atoms completing the heterocyclic nucleus can be, for example, $$-\underset{\underset{O}{\|}}{C}-CH_2-CH_2-$$

or an alkylene group containing 3 or 4 carbon atoms. The atoms completing the heterocyclic nucleus can contain various substituent groups, such as amino, alkyl amino, e.g., methylamino or ethylamino, hydroxyl, carbamyl and the like. An especially suitable activator-toning agent is a heterocyclic activator-toning agent containing at least one nitrogen atom which is preferably a cyclic imide of the formula:

(III)

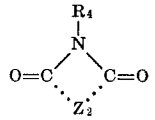

wherein $R_4$ can be hydrogen, hydroxyl, or a metal ion such as potassium, sodium, lithium, silver, gold or mercury; $Z_2$ represents carbon atoms of a series completing a cyclic imide nucleus, typically consisting of from 5 to 6 carbon atoms, e.g., a phthalimide or succinimide nucleus. The atoms of the cyclic imide nucleus can contain various substituent groups, especially amino, alkyl, such as alkyl containing 1 to 5 carbon atoms, such as methyl, ethyl, propyl, butyl or pentyl or aryl, such as aryl containing 6 to 20 carbon atoms, such as phenyl, tolyl and xylyl. Suitable activator-toning agents within Structures II and III which can be employed in the practice of the invention include:

Phthalimide,
N-hydroxyphthalimide,
N-potassium phthalimide,
N-silver phthalimide,
N-mercury phthalimide,
Succinimide, and/or
N-hydroxysuccinimide.

The described activator-toning agents are suitable in a range of concentration; however, they are especially suitable at a concentration from about 0.10 mole to about 1.05 moles of activator-toning agent per mole of oxidizing agent.

Other so-called activator-toning agents can be employed in place of or in combination with the described activator-toning agents. Various so-called toners can be employed for this purpose. Typically a heterocyclic organic toning agent containing at least two hetero atoms in the heterocyclic ring of which at least one is a nitrogen atom is employed. These are described, for example, in U.S. Pat. 3,080,254 of Grant issued Mar. 5, 1963. Suitable toners include, for example, phthalazinone, phthalic anhydride, 2-acetylphthalazinone and 2-phthalylphthalazinone. Other suitable toners are described, for example, in U.S. Pat. 3,446,648 of Workman issued May 27, 1969.

A non-aqueous, polar, organic solvent, such as a compound containing a $$-\underset{\underset{O}{\|}}{C}-,\ -\underset{\underset{O}{\|}}{S}-\ \text{or}\ -SO_2-$$

moiety, in a photosensitive and thermosensitive element, as described, suitable for processing with heat can provide improved maximum image densities, e.g., tetrahydrothiophene-1,1-dioxide, 4-hydroxybutanoic acid lactone and methylsulfinylmethane.

The described elements can comprise other oxidizing agents, especially silver salt oxidizing agents, in combination with the described noble metal salts of carboxylic acids. Other suitable oxidizing agents are, for instance, silver phthlazinone, silver benzotriazole, silver terephthalate and silver phthalate. Oxidizing agents which are not silver salts can be employed, if desired, in the described combination such as zinc oxide, but silver salts are preferred.

A photosensitive and thermosensitive element and emulsions described and used in the practice of the invention can contain various colloids alone or in combination as vehicles, binding agents and in various layers. Suitable materials are typically hydrophobic but hydrophilic materials can also be employed. They are transparent or translucent and include both naturally-occurring substances such as proteins, for example, gelatin, gelatin derivatives, cellulose derivatives, polysaccharides such as dextran, gum arabic and the like; and synthetic polymeric substances such as water-soluble polyvinyl compounds like poly(vinyl pyrrolidone), acrylamide polymers and the like. Other synthetic polymeric compounds which can be employed include dispersed vinyl compounds such as in latex form and particularly those which increase dimensional stability of photographic materials. Suitable synthetic polymers include those described in U.S. Pat. No. 3,142,586 of Nottorf issued July 28, 1964; U.S. Pat. No. 3,193,386 of White issued July 6, 1965; U.S. Pat. No. 3,062,674 of Houck et al. issued Nov. 6, 1962; U.S. Pat. No. 3,220,844 of Houck et al. issued Nov. 30, 1965; U.S. Pat. No. 3,287,289 of Ream et al. issued Nov. 22, 1966; and U.S. Pat. No. 3,411,911 of Dykstra issued Nov. 19, 1968. Effective polymers include water insoluble polymers of alkyl acrylates and methacrylates, acrylic acid, sulfoalkyl acrylates or methacrylates, and those which have cross-linking sites which facilitate hardening or curing as well as those having recurring sulfobetaine units as described in Canadian Pat. No. 774,054. Preferred high molecular weight materials and resins include polyvinyl butyral, cellulose acetate butyrate, polymethyl methacrylate, poly(vinyl pyrrolidone), ethyl cellulose, polystyrene, polyvinyl chloride, chlorinated rubber, polyisobutylene, butadiene-styrene copolymers, vinyl chloride-vinyl acetate copolymers, copolymers of vinyl acetate, vinyl chloride and maleic acid and polyvinyl alcohol.

The photosensitive and thermosensitive layers and other layers of an element employed in the practice of the invention and described herein can be coated on a wide variety of supports. Typical supports include cellulose nitrate film, cellulose ester film, poly(vinyl acetal) film, polystyrene film, poly(ethylene terephthalate) film, polycarbonate film and related films or resinous materials, as well as glass, paper, metal and the like. Typically a flexible support is employed, especially a paper support which can be partially acetylated or coated with baryta and/or an alpha olefin polymer, particularly a polymer of an alpha olefin containing 2 to 10 carbon atoms such as polyethylene, polypropylene, ethylenebutene copolymers and the like.

The photosensitive and thermosensitive and other hardenable layers of an element used in the practice of this invention can be hardened by various organic or inorganic hardeners, alone or in combination, such as aldehydes, and blocked aldehydes, ketones, carboxylic and carbonic acid derivatives, sulfonate esters, sulfonyl halides and vinyl sulfonyl ethers, active halogen compounds, epoxy compounds, aziridines, active olefins, isocyanates, carbodiimides, mixed-function hardeners and polymeric hardeners such as oxidized polysaccharides like dialdehyde starch and oxyguargum and the like.

The photosensitive and thermosensitive elements used in the practice of the invention can contain antistatic or conducting layers. Such layers can comprise soluble salts such as chlorides, nitrates and the like, evaporated metal layers, ionic polymers such as those described in U.S. Pat. No. 2,861,056 of Minsk issued Nov. 18, 1958, and U.S. Pat. No. 3,206,312 of Sterman et al. issued Sept. 14, 1965, or insoluble inorganic salts such as those described in U.S. Pat. No. 3,428,451 of Trevoy issued Feb. 18, 1969. The photosensitive and thermosensitive elements can also contain antihalation materials and antihalation dyes.

The photosensitive and thermosensitive layers or other layers employed in the practice of the invention can contain plasticizers and lubricants. Suitable plasticizers and lubricants include, for example, polyalcohols such as glycerin and diols described, for example, in U.S. Pat. No. 2,960,404 of Milton et al. issued Nov. 1, 1966; fatty acids or esters such as thouse described in U.S. Pat. No. 2,588,765 of Robijns issued Mar. 11, 1952; U.S. Pat. No. 3,121,060 of Duane issued Feb. 11, 1964; and silicone resins such as those described in British Pat. No. 955,061.

The photosensitive and thermosensitive layers or other layers employed in the practice of the invention can contain surfactants such as saponin; anionic compounds such as alkyl aryl sulfonates described, for example, in U.S. Pat. No. 2,600,831 of Baldsiefen issued June 17, 1962; amphoteric compounds such as those described in U.S. Pat. No. 3,133,816 of Ben-Ezra issued May 19, 1964; and adducts of glycidol and an alkyl phenol such as those described in British Pat. No. 1,022,878.

If desired, the photosensitive and thermosensitive elements employed in the practice of the invention can contain matting agents such as starch, titanium dioxide, zinc oxide, in U.S. Pat. No. 2,922,101 of Jelley et al. issued July 11, 1961, and U.S. Pat. No. 2,761,245 of Lynn issued Feb. 1, 1955.

The photosensitive and thermosensitive elements employed in the practice of the invention can contain brightening agents including stilbenes, triazines, oxazoles, and coumarin brightening agents. Water-soluble brightening agents can be used such as those described in German Pat. No. 972,067 and U.S. Pat. No. 2,933,390 of McFall et al. issued Apr. 19, 1960, or dispersions of brighteners can be used such as those described in German Pat. No. 1,150,274; U.S. Pat. No. 3,406,070 of Oetiker et al. issued Oct. 15, 1968, and French Pat. No. 1,530,244.

The various layers including the photosensitive and thermosensitive layers of an element employed in the practice of the invention can contain light-absorbing materials, filter dyes, antihalation dyes and absorbing dyes such as those described in U.S. Pat. No. 3,253,921 of Sawdey issued May 31, 1966; U.S. Pat. No. 2,274,782 of Gaspar issued Mar. 3, 1942; U.S. Pat. No. 2,527,583 of Silberstein et al. issued Oct. 31, 1950; and U.S. Pat. No. 2,956,879 of Van Campen issued Oct. 18, 1960. If desired, the dyes can be mordanted, for example, as described in U.S. Pat. No. 3,282,699 of Jones et al. issued Nov. 1, 1966.

The photosensitive and thermosensitive layers used in the practice of the invention can be coated by various coating procedures including dip coating, airknife coating, curtain coating or extrusion coating using hoppers such as described in U.S. Pat. No. 2,681,294 of Beguin issued June 15, 1954. If desired, two or more layers can be coated simultaneously such as by the procedures described in U.S. Pat. No. 2,761,791 of Russell issued Sept. 4, 1956, and British Pat. No. 837,095.

If desired, the photosensitive silver halide can be prepared in situ, in the photosensitive and thermosensitive coatings of an element employed in the practice of the invention. Such a method is described, for example, in U.S. Patent 3,457,075 of Morgan et al. issued July 22, 1969. For example, a dilute solution of a halogen acid such as hydrochloric acid can be applied to the surface of a thin coating containing an organic silver salt, such as silver behenate, on a suitable substrate followed by removal of the solvent if desired. Silver halide is thus formed in situ throughout the surface of the coating of the organic silver salt.

The photosensitive silver halide can be prepared on the oxidizing agent such as silver behenate or silver stearate or other organic silver salt prior to application of the silver halide on the support employed. This is also described in U.S. Pat. 3,457,075 of Morgan et al. issued July 22, 1969, for example, a halogen acid such as hydrochloric acid or hydrobromic acid can be mixed with an organic silver salt in a suitable reaction medium. A halide salt more soluble than the organic silver salt can be added to a suspension of the organic silver salt to form the silver halide. A suitable reaction medium includes water or other solutions which do not interfere with the reaction.

Stability to print out from light exposure is increased by employing highly purified materials; for example, freedom from halides and sulfides increase stability to light exposure. The use of highly purified silver behenate can, for example, reduce propensity to print out in background areas of an element prepared according to the invention.

Spectral sensitizing dyes can be used conveniently to confer additional sensitivity to the light-sensitive silver halide employed in the practice of the invention. For instance, additional spectral sensitization can be obtained by treating the silver halide with a solution of a sensitizing dye in an organic solvent or the dye can be added in the form of a dispersion as described in British Patent 1,154,781. For optimum results the dye can either be added to the emulsion as a final step or at some earlier stage.

Sensitizing dyes useful in sensitizing silver halide emulsions are described, for example, in U.S. Pat. 2,526,632 of Brooker et al. issued Oct. 24, 1950; U.S. Patent 2,503,-776 of Sprague issued Apr. 11, 1950; U.S. Patent 2,493,-748 of Brooker et al. issued Jan. 10, 1950, and U.S. Pat. 3,384,486 of Taber et al. issued May 21, 1968. Spectral sensitizers, which can be used, include the cyanines, merocyanines, complex (trinuclear or tetranuclear) cyanines, holopolar cyanines, styryls, hemicyanines such as enamine, hemicyanines, oxonols and hemioxonols. Dyes of the cyanine classes can contain such basic nuclei as the thiazoles, selenazoles, and imidazoles. Such nuclei can contain alkyl, alkylene, hydroxyalkyl, sulfoalkyl, carboxyalkyl, aminoalkyl, and enamine groups that can be fused to carbocyclic or heterocyclic ring systems either unsubstituted or substituted with halogen, phenyl, alkyl, haloalkyl, cyano, or alkoxy groups. The dyes can be symmetrical or unsymmetrical and can contain alkyl, phenyl, enamine or heterocyclic substituents on the methine or polymethine chain.

The merocyanine dyes can contain the basic nuclei described as well as acid nuclei such as thiohydantoins, rhodanines, oxazolidenediones, thiazolidenediones, barbituric acids, thiazolineones, and malononitrile. These acid nuclei can be substituted with alkyl, alkylene, phenyl, carboxyalkyl, sulfoalkyl, hydroxyalkyl, alkoxyalkyl, alkylamine groups, or heterocyclic nuclei. Combinations of these dyes can be used, if desired. In addition, supersensitizing addenda which do not absorb visible light may be included such as, for instance, ascorbic acid derivatives, azaindenes, cadmium salts, and organic sulfonic acid as described in U.S. Pat. 2,933,390 of McFall et al. issued Apr. 19, 1960, and U.S. Pat. 2,937,089 of Jones et al. issued May 17, 1960.

The sensitizing dyes and other addenda used in the practice of the invention can be added from water solutions or suitable organic solvent solutions can be used. The compounds can be added using various procedures including, for example, those described in U.S. Pat. 2,912,343 of Collins et al. issued Nov. 10, 1959; U.S. Pat. 3,342,605 of McCrossen et al. issued Sept. 19, 1967; U.S. Pat. 2,996,287 of Audran issued Aug. 15, 1961; and U.S. Pat. 3,425,835 of Johnson et al. issued Feb. 4, 1969.

A range of concentration of dye can be employed in the practice of the invention. The desired concentration will be influenced by the desired spectral sensitivity, other components in the system, the desired image, processing conditions and the like. Typically a concentration of the described sensitizing dye is about 0.05 to about 1 milligram per square foot of the described photographic and thermosensitive element, usually about 0.1 milligram per square foot of dye being employed. In elements, as described, typically a support is provided with a light-stable organic silver salt oxidizing agent, an organic reducing agent, and photosensitive silver salt, especially silver halide, which provides a photosensitive and thermosensitive element. A visible image on the photosensitive and thermosensitive element can be produced within a few seconds after exposure by heating the element to moderately elevated temperatures, e.g., from about 80° C. to about 250° C. For example, a visible image can be developed within about 0.5 to about 60 seconds at about 80° C. to about 250° C.

The addition of a polyvalent metal salt image amplifier to the described photosensitive and thermosensitive compositions and elements can provide in many cases uniformly increased image density upon development of a latent image. Suitable polyvalent metal salt image amplifiers include zinc acetate, cadmium acetate or cupric acetate. These can be employed in a range of concentration depending upon the desired image, the particular components of the composition, and the like, but usually a concentration of about 0.005 to about 0.20 mole of the polyvalent metal salt image amplifier per mole of the described heavy metal salt oxidizing agent, e.g., per mole of silver behenate, is sufficient.

Various onium halide speed increasing compounds, especially ammonium, phosphonium and/or sulfonium halides can be employed in the described photosensitive and thermosensitive compositions and elements to provide increased photosensitivity. Especially suitable onium halides include alkylquaternary ammonium halides, e.g., 1-phenethyl-2-picolinium bromide or trimethylphenylammonium bromide. The concentration of onium halide speed increasing compound which is suitable will vary depending on the various other components of the described photosensitive and thermosensitive compositions and elements, the desired image, and the like. A concentration of about 0.01 to about 1.00 mole of onium halide speed increasing compound per mole of photosensitive silver salt, e.g., photosensitive silver halide, in the described composition or element is usually suitable.

It is desirable in many cases to employ an image stabilizer or stabilizer precursor in the described photosensitive and thermosensitive compositions and elements. Such an image stabilizer precursor upon heating in the composition or element provides improved post-processing image stability, less background stain and in many cases more neutral image tone. The combination of a reducing agent, such as a bis-naphthol, as described, with a heavy metal salt oxidizing agent, also as described, such as silver behenate, with an azole thioether stabilizer precursor or a blocked azole thione stabilizer precursor is especially suitable. A suitable image stabilizer precursor is, for example, 5-acetyl-4-methyl-2-(3-oxobutylthio)thiazole. A concentration of about 0.002 to about 0.10 mole of the stabilizer precursor per mole of photosensitive silver halide in the photosensitive and thermosensitive composition or element is usually suitable.

Other addenda known to be useful in photosensitive and thermosensitive elements of this type, such as described in British Patent 1,161,777 published Aug. 20, 1969, U.S. Patent 3,152,904 of Sorensen and Shepard, issued Oct. 13, 1964, and U.S. Patent 3,457,075 of Morgan and Shely issued July 22, 1969, can be employed in the practice of the invention.

It is possible, to prepare silver behenate in a non-aqueous solvent, in the absence of a peptizer. But, this provides an uncontrolled random distribution of particle size and geometric configuration which is not desirable in many cases. An example of preparation of a noble metal salt of a carboxylic acid in the absence of a peptizer is the preparation of silver behenate by adding a solution of silver trifluoroacetate in ethanol to a solution of behenic acid in ethanol. The reactant mixture is stirred for several minutes at about 50° C. and then the solid product is separated by filtration. The product can be purified by washing with acetone and drying. This provides highly pure silver behenate.

The following examples are included for a further understanding of the invention.

Example 1.—This example illustrates the method of preparing noble metal salts of carboxylic acids, e.g., silver behenate.

Two solutions are prepared having the following composition:

Solution A:
- Behenic acid—3.4 g.
- Polyvinyl butyral—2.5 g.
- Toluene—100.0 ml.

Solution B:
- Silver trifluoroacetate—2.2 g.
- Polyvinyl butyral—1.0 g.
- Acetone—25.0 ml.

Solution B is added to Solution A at atmospheric pressure at a controlled rate of 2.0 ml./minute while maintaining both solutions at a temperature of 23° C. The resulting silver behenate dispersion contains uniform particles of an average size of about 1.0 micron as determined by an optical microscope.

Example 2.—This example illustrates the use of a noble metal salt of a carboxylic acid prepared in the process of the invention as described.

A photosensitive and thermosensitive element is prepared by combining the following solutions:

| | Ml. |
|---|---|
| Acetone containing 10.7 mg. silver bromide per ml. | 2.0 |
| Silver behenate dispersion (described in Example 1) | 2.0 |
| Methanol containing 7 mg. of 3-carboxymethyl-5-[(3-methyl-2(3)-thiazolinylidenes) - iso - propylidene] rhodanine per mil. of solution | 1.0 |
| Acetone containing 3.0% by weight 2,2′-dihydroxy-1,1′-binaphthyl | 2.0 |
| Acetone containing 1.0% by weight phthalimide | 2.0 |
| Acetone | 1.0 |

The resulting photosensitive and thermosensitive composition is coated on a resin-treated paper support at a wet thickness of 0.004 inch.

A sample of the air-dried coating is sensitometrically exposed for 5 seconds to tungsten light and then heat processed for 10 seconds on a curved hot block at a temperature of 125° C. A visible line image is observed.

Example 3.—Similar results are obtained as in Examples 1 and 2 upon substitution of polyvinyl acetate, polyvinyl heptal or polyvinyl laural for polyvinyl butyral.

Example 4.—Simialr results are obtained as in Examples 1 and 2 upon substitution of stearic acid or lauric acid for behenic acid.

Example 5.—A silver behenate dispersion is prepared by first preparing the following solutions:

Solution A:
- Behenic acid—3.4 g.
- Polyvinyl butyral—2.5 g.
- Toluene—100.0 ml.
- Temperature—23° C.

Solution B:
- Silver tetrafluoroborate—1.55 g.
- Polyvinyl butyral—1.0 g.
- Acetone—25.0 ml.
- Temperature—23° C.

Solution B is added to Solution A at a controlled rate of addition (2.0 ml. per minute).

The procedure for the preparation of the photosensitive and thermosensitive element of Example 2 is repeated with the exception that the silver behenate dispersion of this example is substituted for the silver behenate dispersion of Example 1.

A sample of the photosensitive and thermosensitive element of this example is exposed and heat processed by the procedure described in Example 2. A visible line image results.

The invention has been described in detail with particular reference to preferred embodiments thereof, but it will be understood that variations and modifications can be effected within the spirit and scope of the invention.

What is claimed is:

1. A method of preparing a photosensitive composition comprising (a) admixing a non-aqueous solution of an organic carboxylic acid with a non-aqueous solution of a noble metal trifluoroacetate or tetrafluoroborate in the presence of about 5 to about 200 grams of an organic peptizer per liter of total solution, and (b) admixing the resulting product with a photosensitive silver salt.

2. A method of preparing a photosensitive and thermosensitive composition comprising (a) admixing a non-aqueous solution of a fatty acid with a non-aqueous solution of a silver salt in the presence of about 5 to about 200 grams of an organic, polymeric peptizer and (b) admixing the resulting product with an organic reducing agent and photosensitive silver halide.

3. A method as in claim 1 of preparing a photosensitive and thermosensitive composition comprising (a) admixing in about stoichiometric concentrations a solution comprising silver trifluoroacetate and polyvinyl butyral in acetone with a solution comprising behenic acid and polyvinyl butyral in toluene and (b) admixing the resulting product with 2,2′-dihydroxy-1,1′-binaphthyl, photosensitive silver halide, phthalimide, and a spectral sensitizing dye in acetone.

4. A method of preparing a photosensitive composition comprising (a) preparing a silver salt of a fatty acid having an average particle size of about 0.1 to aobut 1.0 micron comprising admixing in about stoichiometric concentrations a solution comprising silver trifluoroacetate and polyvinylbutyral in acetone with a solution comprising a fatty acid and polyvinyl butyral in toluene at about 18° C. to about 40° C. and (b) admixing the resulting product with photosensitive silver halide.

5. A method of preparing a photosensitive composition comprising (a) preparing a silver salt of a fatty acid having an average particle size of about 0.1 to about 1.0 micron comprising admixing in about stoichiometric concentrations a solution comprising silver tetrafluoroborate and polyvinylbutyral in acetate with a solution comprising a fatty acid and polyvinylbutyral in toluene at about 18° C. to about 40° C. and (b) admixing the resulting product with photosensitive silver halide.

6. A method of preparing a photosensitive and thermosensitive composition comprising (a) preparing a silver salt of a fatty acid having an average particle size of about 0.1 to about 1.0 micron comprising admixing in about stoichiometric concentrations a solution comprising silver trifluoroacetate and polyvinylbutyral in acetone with a solution comprising fatty acid and polyvinylbutyral in toluene at about 18° C. to about 40° C. and (b) admixing the resulting product with an organic reducing agent and photosensitive silver halide.

7. A method of preparing (a) a silver salt of a fatty acid having an average particle size of about 0.1 to about 1.0 micron comprising admixing in about stoichiometric concentrations a solution comprising silver tetrafluoroborate and polyvinylbutyral in acetone with a solution comprising a fatty acid and polyvinylbutyral in toluene at about 18° C. to about 40° C. and (b) admixing the resulting product with an organic reducing agent and photosensitive silver halide.

References Cited

UNITED STATES PATENTS

| | | | |
|---|---|---|---|
| 3,458,544 | 7/1969 | Bryan | 117—34 |
| 3,457,075 | 7/1969 | Morgan et al. | 96—67 |
| 3,532,502 | 10/1970 | Boyer et al. | 96—114.6 |

WILLIAM D. MARTIN, Primary Examiner

W. R. TRENOR, Assistant Examiner

U.S. Cl. X.R.

96—114.6

PO-1050
(5/69)

UNITED STATES PATENT OFFICE
CERTIFICATE OF CORRECTION

Patent No. 3,700,458 Dated October 24, 1972

Inventor(s) Robert D. Lindholm

It is certified that error appears in the above-identified patent and that said Letters Patent are hereby corrected as shown below:

Column 1, line 54, "27" should read ---25---. Line 54, "1959" should read ---1969---.

Column 3, line 48, "carboxlic" should read ---carboxylic---.

Column 8, line 52, "thouse" should read ---those---.

Column 10, line 4, after "as the", ---thiazolines, oxazolines, pyrrolines, pyridines, oxazoles,--- should be inserted.

Column 12, line 7, that part of the formula reading "thiazolinylidenes" should read ---thiazolinylidene---. Line 8, "mil." should read ---ml.---.

In the Claims:

Column 13, line 5, "aobut" should read ---about---. Line 17, "acetate" should read ---acetone---.

Signed and sealed this 29th day of May 1973.

(SEAL)
Attest:

EDWARD M. FLETCHER, JR.
Attesting Officer

ROBERT GOTTSCHALK
Commissioner of Patents